United States Patent [19]

Gidley

[11] Patent Number: 5,099,924
[45] Date of Patent: Mar. 31, 1992

[54] CONDITIONING OF FORMATION FOR SANDSTONE ACIDIZING

[76] Inventor: John L. Gidley, 5211 Caversham Dr., Houston, Tex. 77096

[21] Appl. No.: 631,325

[22] Filed: Dec. 20, 1990

[51] Int. Cl.⁵ ............................................. E21B 43/27
[52] U.S. Cl. .................................. 166/307; 166/312; 252/8.553
[58] Field of Search ................. 166/271, 307, 312; 252/8.553

[56] References Cited

U.S. PATENT DOCUMENTS

| | | | |
|---|---|---|---|
| 2,308,414 | 1/1943 | Campbell | 166/307 |
| 2,885,004 | 5/1959 | Perry | 166/307 |
| 3,254,718 | 6/1966 | Dunlap | 166/307 |
| 3,481,404 | 12/1969 | Gidley | 166/307 |
| 3,504,747 | 4/1970 | Vogt, Jr. et al. | 166/307 |
| 3,543,856 | 12/1970 | Knox et al. | 166/307 X |
| 3,568,772 | 3/1971 | Gogarty et al. | 166/307 X |
| 3,831,679 | 8/1974 | Presley et al. | 166/307 |
| 3,902,557 | 9/1975 | Shaughnessy et al. | 166/307 X |
| 3,915,233 | 10/1975 | Slusser | 166/307 |
| 4,414,118 | 11/1983 | Murphey | 166/307 X |
| 4,882,075 | 11/1989 | Jones | 166/307 X |
| 4,886,609 | 12/1989 | Walton | 252/8.553 X |

Primary Examiner—George A. Suchfield
Attorney, Agent, or Firm—R. L. Graham

[57] ABSTRACT

A damaged zone of a subterranean oil-bearing formation is treated with four sequential fluids:
(a) a formation conditioning fluid, preferably carbon dioxide, to miscibly displace oil from the damaged zone;
(b) an HCl acid preflush;
(c) a mud acid; and
(d) an afterflush.

9 Claims, 1 Drawing Sheet

CONDITIONING OF FORMATION FOR SANDSTONE ACIDIZING

FIELD OF INVENTION

This invention relates generally to acidizing in oil producing sandstone formations. In one aspect it relates to a method of conditioning a sandstone formation to improve the effects of acid. In still another aspect, the invention relates to the use of carbon dioxide as a conditioning agent for acidizing subterranean sandstone formations.

BACKGROUND OF THE INVENTION

Sandstone acidizing is a stimulation treatment which involves the injection of an acid into the formation at matrix pressures (i.e., below that which fractures the formation) to react with formation materials such as sand, clays, drilling fluid, cement filtrate, and the like. The treatment normally involves the sequential injection of three fluids:

(1) Preflush: An aqueous acid solution, usually HCl, is injected to displace connate water from the near wellbore region and to react with calcite or other calcareous materials in the formation.

(2) Mud acid: Immediately following the preflush, an acid capable of reacting with siliceous constituents in the formation is injected. The acid generally is a mixture of HF and HCl, typically an aqueous solution of 3% HF and 12% HCl. The HF reacts with clays, sand, drilling mud and cement filtrate; whereas the main function of the HCl is to keep the pH low.

(3) Afterflush: The mud acid treatment is followed by an afterflush to displace the mud acid into the formation and restore water wetability to the formation and acid reaction products.

The effectiveness of sandstone acidizing is dependent upon the ability of the mud acid to improve formation permeability by reacting with formation materials. Over the years it has been observed that gas wells and oil wells respond differently to sandstone acid treatments. Studies have shown that gas well stimulation by sandstone acidizing is generally proportional to the volume of mud acid employed; whereas oil well stimulation responds proportionately only to relatively low acid volumes. Medium to high volume treatments of mud acid frequently do not provide additional benefits and in fact sometimes reduce stimulation.

Some studies indicate that the decline in acid stimulation in oil wells may be caused by disintegration of the sandstone matrix due to acid reaction. Although this mechanism may be operative, it does not explain the difference between gas well and oil well response to sandstone acid treatments. It appears that the disintegration of the matrix would occur in both types of sandstone formations.

As mentioned above and as described in more detail below, the method of the present invention employs a solvent in advance of the three-stage sandstone acidizing treatment to condition the formation and improve its response to the acid treatment.

Prior art which discloses the use of solvents in well acidizing operations include U.S. Pat. Nos.: 3,254,718, 3,481,404, 3,548,945, 3,902,557, 3,970,148, and 4,823,874.

The method disclosed in U.S. Pat. No. 3,254,718 involves the use of solvents in a preflush of an acid treatment for calcareous formations. As is well known in the industry, calcareous formations and sandstone formations have different properties which require different acid treatments. For example, calcareous materials have a positive surface charge at a pH below 8 which makes them oil wet; whereas sands have a negative surface charge making them water wet. Moreover entirely different acids are used in each, with HCl predominating in the acid treatment of calcareous formations and mud acid in the treatment of sandstone formations. The different acid reactions produce totally different reaction products, which require different treatments to avoid adverse effects to the acid reaction products.

U.S. Pat. Nos. 3,481,404 and 3,548,945 disclose the use of solvents in sandstone acid solutions, or in the afterflush of such acid solutions.

U.S. Pat. No. 3,902,557 discloses the use of solvents in the acid solution or afterflush in sandstone acidizing to prevent the occurrence of emulsion blocks.

U.S. Pat. No. 3,970,148 discloses an acidizing method involving the sequential injection of an aromatic solvent preflush and an alcohol-acid solution.

U.S. Pat. No. 4,823,874 discloses the use of certain antisludging agents in the acid solution of well acidizing compositions.

SUMMARY OF THE INVENTION

Figure 1:
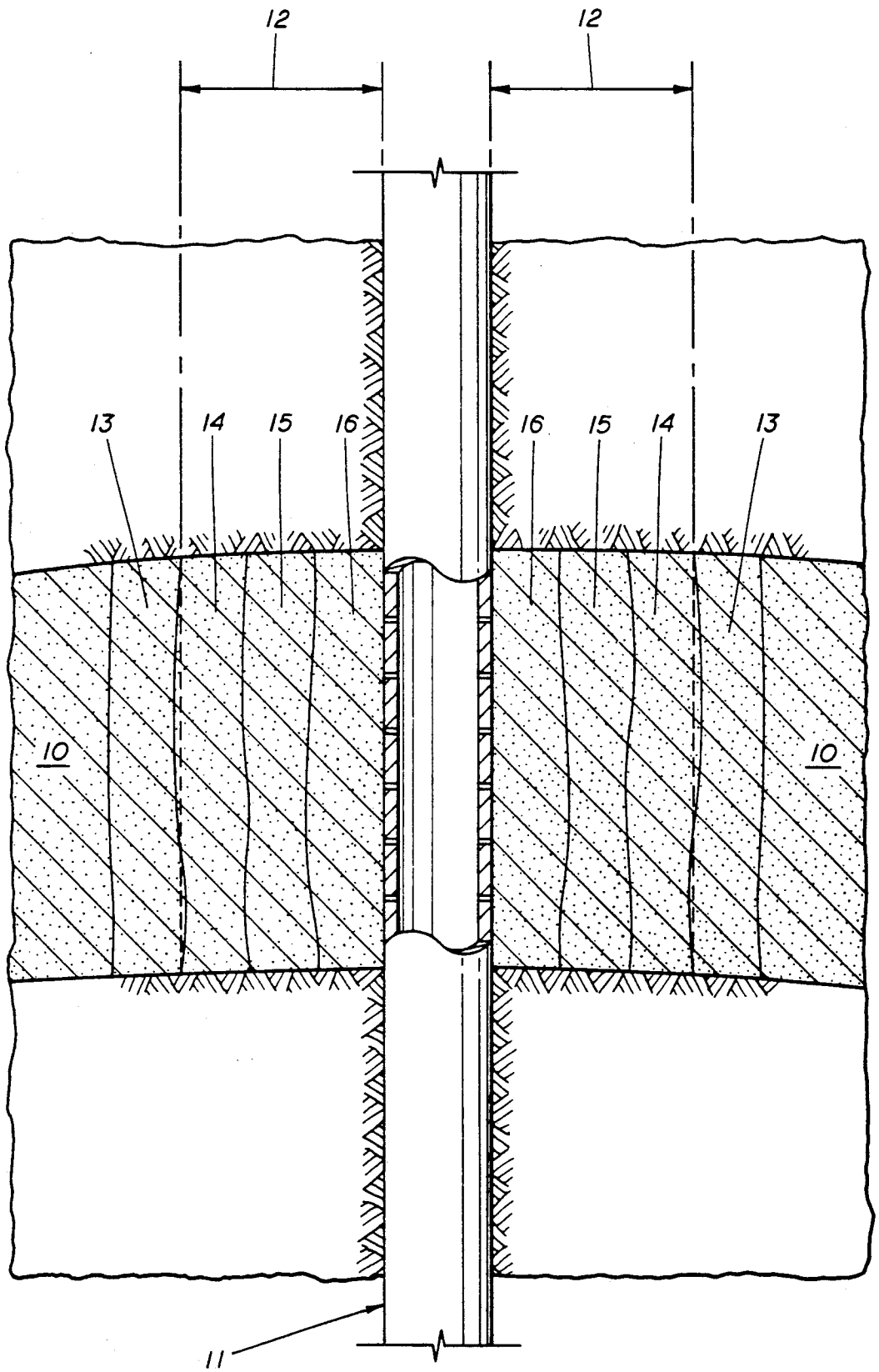
FIG. 1 is a schematic view of a well illustrating the injection sequence of the four stages used in the present invention.

It has been discovered that by preconditioning the sandstone oil-bearing formation, a sandstone acidizing treatment in the formation can be significantly improved. The method of the present invention involves the steps of sequentially injecting into a sandstone formation at matrix injection rates the following fluids:

(a) a preconditioning solvent to miscibly displace and remove the oil from the zone to be acidized;
(b) an aqueous solution of HCl;
(c) an aqueous solution of mud acid; and
(d) an afterflush.

The preferred preconditioning solvent is carbon dioxide. Mutual solvents, or partial mutual solvents for both oil and water, and micellar solvents are also useful.

It is believed that the preconditioning solvent displaces the oil outwardly from the zone to be treated thereby effectively eliminating the mixing of oil and acid or acid reaction products. Without the preconditioning solvent treatment, oil left in the invaded region interacts with the acid and contacts the newly created surfaces (e.g., sand or precipitated reaction products of HF and silica such as hydrous silica and ortho-silicic acid) and tenaciously adheres thereto. This tends to render the new surfaces oil wet, leading to cleanup problems in the zone treated.

It is essential in carrying out the method of the present invention to separate the reactive mud acid from the oil solubilized by the conditioning solvent solution to eliminate or minimize the interaction between these materials. If the solvent were included in the HCl preflush, as taught by the prior art, the reprecipitated silica products resulting from the acid reaction with the sandstone formation could adsorb the oil and create cleanup problems.

DESCRIPTION OF THE PREFERRED EMBODIMENTS

With reference to FIG. 1, a sandstone oil-bearing subterranean formation 10 is schematically illustrated as being penetrated by wellbore 11. The critical radial flow area from the formation 10 to the wellbore is in the near-wellbore region which extends a short distance 12 from the wellbore. This is the region most likely to be damaged during the drilling or completion process, and the removal of this damage requires the effective use of acids reactive with clays and the silicate minerals that are involved in the wellbore damage process. The near-wellbore region can vary within a wide range depending on several factors such as formation permeability, mineralogy of the formation, duration of the drilling process exposing the zone to the drilling operation, etc. For most wells, however, the near-wellbore region ranges from a few inches to a few feet (generally less than 2 or 3 feet) from the wellbore.

The main purpose of sandstone acidizing treatments is to improve the permeability in the near-wellbore region by removing damage (e.g., drilling mud solids, altered formation clays, and other effects of drilling mud and cement filtrates) or removing migrating fines that have penetrated this region, (e.g., clays) or by creating or increasing the size of flow channels in the porous sandstone. All of these mechanisms may be involved in sandstone acidizing.

In accordance with the method of the present invention, the sandstone acidizing treatment involves injecting a series of fluids into the formation 10 via borehole 11 as follows:

(a) injecting a formation conditioning solvent to miscibly displace indigenous oil from the zone 10 to be acidized to form a bank 13;

(b) injecting an aqueous acid preflush solution into the formation to form a preflush bank 14 to displace the formation conditioning bank 13 radially outwardly into the undamaged formation 10;

(c) injecting a mud acid solution into the formation sufficient to dissolve the clays within the damaged zone and to form a bank 15 which displaces the preceding banks 13 and 14 farther outwardly into the formation 10; and (d) finally, injecting an afterflush into the formation 10 to form bank 16 which displaces preceding banks 13, 14, and 15 radially outwardly farther into the formation, and to accomplish further wettability adjustments required to increase the relative permeability of the formation to the oil present in it.

The compositions of, and injection techniques for, the preflush solution, the mud acid solution, and the afterflush solution can be generally in accordance with prior art techniques, particularly those described in Chapter 9 of *Acidizing Fundamentals*, by B. B. Williams, J. L. Gidley, and R. S. Schechter, the disclosure of which is incorporated herein by reference. The description of the present invention will include a brief description of these solutions with particular emphasis on the formation conditioning phase of the process.

*Formation Conditioning Solution*: The primary function of this fluid is to displace the oil out of the near wellbore region by miscible displacement. The fluid preferably is a solvent for oil. Useable fluids include (in order of preference) carbon dioxide, micellar solvents, and mutual solvents. Since the treatment should leave the sand water wet in this region, it may in some cases be preferred to employ an aqueous surfactant solution in the conditioning fluid, although the latter is not generally necessary.

The carbon dioxide injected may comprise from 1 to 20 pore volumes of the damaged zone to be acidized, and since this region is generally within 2 to 3 feet of the wellbore, the volume of carbon dioxide required per foot of formation thickness may vary from 10 to 400 cubic feet of carbon dioxide measured at reservoir conditions. Liquid carbon dioxide may be used along with aqueous solutions of other additives such as surfactants, solvents, or salts etc.

The liquid carbon dioxide at the surface will be converted in the deeper formations to gas by the time it reaches the formation. Thus, bank 13 in passing through the near wellbore region will be dissolved in indigenous oil and form a miscible bank as it moves outwardly into the formation. This low viscosity bank sweeps oil ahead of it and surfactant, if present in the fluid, leaves the sand water wet. This conditioning of the formation in the zone to be treated maximizes the effects of the subsequent acidizing steps of the process.

In some formations and with certain oils it is also preferred to employ a micellar solvent as the conditioning solvent to displace the oil and water wet the formation sand and clays to enhance oil removal therefrom. These micellar solvents contain high molecular weight, acid insoluble polar organic components. The preferred micellar solvent is a blend of ethoxylated alcohols, immiscible alcohols, containing from 4 to 10 carbon atoms, and a surfactant capable of dispersing the immiscible alcohols as a micelle in water or acid.

Likewise, mutual solvents, which include the mono, di, tri, and tetra ethylene glycols of the mono ethers, containing 4 to 10 carbon atoms, may also be useful for miscibly displacing the oil and water-wetting the remaining formation surfaces.

The formation conditioning solution preferably should be free of any reactive components such as HCl or HF to avoid mixing the spent acid products with the incompletely displaced oil.

ACID PREFLUSH

The acid preflush is preferably a 7½% to 15% solution of HCl. The acid preflush, in addition to reacting with calcite or other carbonates in the formation, provides the additional function of separating the preceding conditioning fluids and connate water from the bank containing reactive HF. If the acid preflush were not used, the reaction products of hydrofluoric acid and the silicate and siliceous minerals could contact oil and become oil wet or otherwise form damaging precipitates. Such precipitates are difficult to remove and frequently lead to formation blockage.

MUD ACID SOLUTION

The mud acid is a mixture of from 6% to 12% HCl and 1.5% to 3% HF. Both formulations are commonly used (e.g., 6% HCl, 1.5% HF; 12% HCl, 3% HF).

AFTERFLUSH

The afterflush displaces the preceding mud acid from the near-wellbore region into the formation. The afterflush may be aqueous (e.g., ammonium chloride or HCl acid) or a hydrocarbon liquid (e.g., diesel oil, or light crude oil) but preferably should include a mutual solvent to enhance water wetability of the sandstone formation.

OTHER ADDITIVES

The solutions injected into the formation will include corrosion inhibitors and may include other additives such as surfactants, iron chelating agents, demulsifying agents, etc.

OPERATIONS

In carrying out the method of the present invention, conventional equipment and techniques may be employed. Generally, each solvent or solution will be premixed and injected into this formation in the proper sequence and at matrix injection rates and pressures. Fracturing pressures which have been shown to be detrimental (e.g., Acidizing Fundamentals, cited above) are to be avoided.

Although the relative proportions of each fluid or solution may vary within a wide range, the following presents preferred volumes per foot of formation treated.

|  | BROAD RANGE (Gal.) | PREFERRED RANGE (Gal.) | MOST PREFERRED RANGE (Gal.) |
| --- | --- | --- | --- |
| Formation Conditioning Fluid (at surface) | 20–2000 | 50–1000 | 100–500 |
| Acid Preflush | 10–300 | 20–100 | 35–60 |
| Mud Acid Treatment | 10–300 | 20–200 | 50–150 |
| Afterflush | [equal to mud acid volume or some small multiple thereof, e.g., 1.0 to 1.5] | | |

As a general rule, the volume of each fluid is related to the pore volume of the near-wellbore region to be treated.

After placement of the afterflush, the well should be turned around and produced immediately.

What is claimed is:

1. A method of matrix acidizing a sandstone oil-bearing formation surrounding a wellbore which comprises:
   (a) injecting through the wellbore and into the formation a conditioning fluid having solvency for, or in, oil contained within the zone to be treated to miscibly displace the oil outwardly from the wellbore, said conditioning fluid including a solvent selected from the group consisting of (i) carbon dioxide and (ii) mixtures of carbon dioxide and another solvent;
   (b) injecting an aqueous acid preflush solution into the formation to displace the conditioning fluid outwardly from wellbore;
   (c) injecting an acid solution containing HF into the formation to react with clays in the formation and to displace the acid preflush outwardly from the wellbore; and
   (d) injecting an afterflush solution into the formation to water wet the formation and to displace the preceding fluids radially outwardly from the wellbore.

2. The method of claim 1 wherein said another solvent is an aqueous solution of a micellar solvent capable of dissolving oil in the formation.

3. The method of claim 1 wherein said another solvent is a mutual solvent for oil and water.

4. The method of claim 1 wherein the acid solution contains 1.5 to 3% HF and 6 to 12% HCl (i.e., mud acid).

5. The method of claim 4 wherein the volume of mud acid is within the range of 10 to 300 gallons of mud acid per foot of net vertical thickness of the formation being treated.

6. The method of claim 5 wherein the formation conditioning fluid is at least ten pore volumes of the damaged zone being treated.

7. The method of claim 1 wherein the preflush is aqueous HCl.

8. A method of matrix acidizing a damaged zone of a subterranean sandstone oil-bearing formation surrounding a wellbore which comprises the sequential injection into the formation of the following fluids:
   (a) a sandstone conditioning fluid capable of miscibly displacing oil in the formation to remove the oil from the near wellbore region to be acidized, said conditioning fluid being selected from the group consisting of carbon dioxide and mixtures of carbon dioxide and another solvent;
   (b) an aqueous solution of HCl to displace the conditioning fluid outwardly from the wellbore and react with calcareous material in the formation; and
   (c) a mud acid solution to react with silicious material in the formation, the volume of the mud acid solution being from 10 to 300 gallons per foot of formation thickness.

9. The method of claim 8 wherein the conditioning fluid is carbon dioxide and the volume injected is from 100 to 500 gallons per foot of formation height as measured at the surface.

* * * * *